Figure 1:
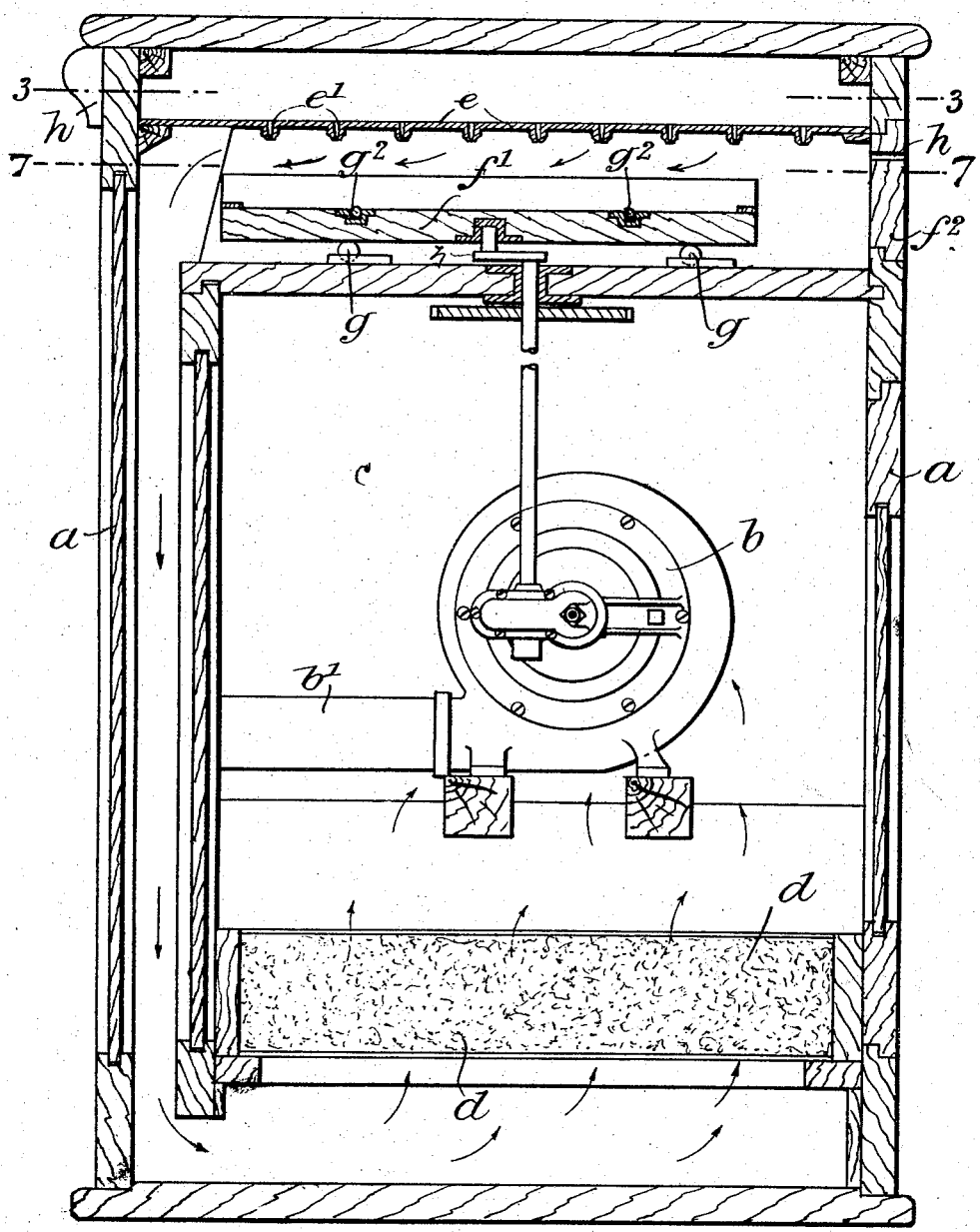

T. H. FISHBURN.
APPARATUS FOR EXTRACTING DUST FROM TYPE CASES AND THE LIKE.
APPLICATION FILED OCT. 30, 1909.

1,009,294.

Patented Nov. 21, 1911.

9 SHEETS—SHEET 2.

WITNESSES
W. P. Burke
John G. Percival

INVENTOR
Thomas Henry Fishburn
BY
ATTY

T. H. FISHBURN.
APPARATUS FOR EXTRACTING DUST FROM TYPE CASES AND THE LIKE.
APPLICATION FILED OCT. 30, 1909.

1,009,294.

Patented Nov. 21, 1911.

9 SHEETS—SHEET 4.

WITNESSES
W. P. Burke
John A. Percival

INVENTOR
Thomas Henry Fishburn
BY
ATTY

T. H. FISHBURN.
APPARATUS FOR EXTRACTING DUST FROM TYPE CASES AND THE LIKE.
APPLICATION FILED OCT. 30, 1909.

1,009,294.

Patented Nov. 21, 1911.

9 SHEETS—SHEET 7.

T. H. FISHBURN.
APPARATUS FOR EXTRACTING DUST FROM TYPE CASES AND THE LIKE.
APPLICATION FILED OCT. 30, 1909.

1,009,294.

Patented Nov. 21, 1911.

9 SHEETS—SHEET 8.

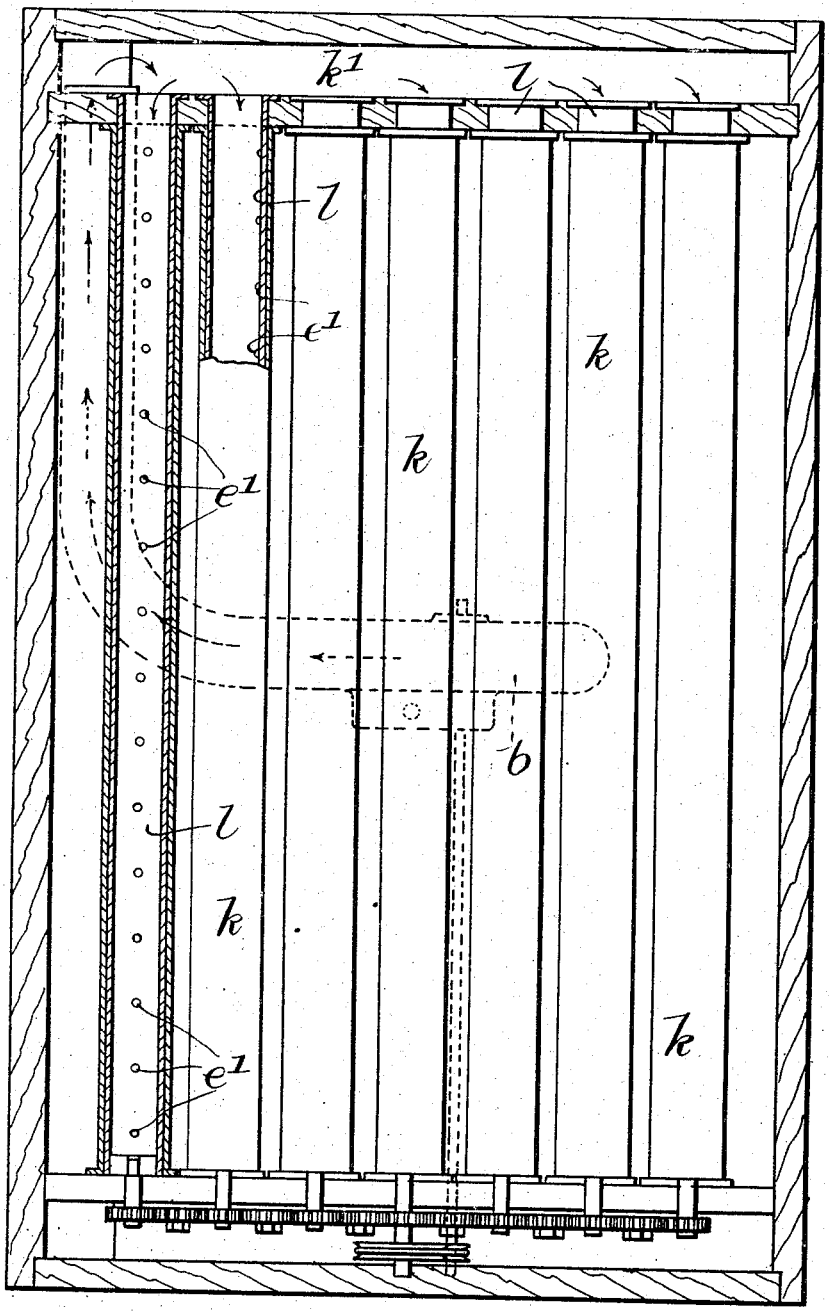

UNITED STATES PATENT OFFICE.

THOMAS HENRY FISHBURN, OF LONDON, ENGLAND.

APPARATUS FOR EXTRACTING DUST FROM TYPE-CASES AND THE LIKE.

1,009,294.

Specification of Letters Patent. Patented Nov. 21, 1911.

Application filed October 30, 1909. Serial No. 525,586.

*To all whom it may concern:*

Be it known that I, THOMAS HENRY FISHBURN, a subject of the King of Great Britain and Ireland, residing at 54 Chatsworth Gardens, Acton, London, W., England, have invented certain new and useful Improvements in Apparatus for Extracting Dust from Type-Cases and the Like, of which the following is a specification.

This invention relates to apparatus for extracting dust from type cases and the like in which the type case is placed in a closed casing and subjected to the action of a blast of air while being agitated, to shake the type or the like, the dust laden air being drawn off by a suction fan, and has for its object to simplify the construction of such apparatus, to agitate the type without damaging same, to subject the whole case to air blasts applied simultaneously over the whole surface or to a sweeping blast delivered successively from jets arranged at intervals over the whole surface thus insuring a more thorough blowing out of the dust, and to prevent the dust laden air from being discharged into the atmosphere.

My invention comprises inner and outer closed chambers arranged in a closed system containing a fan or blower, an air distributer, and a filter. If desired external air inlets may be provided to the system.

My invention also comprises improved agitating mechanism whereby a circular oscillating and jogging motion is obtained which throws the type from side to side.

In the preferred form of my invention I employ a single blower, fan or bellows for blowing and exhausting and connect the same to a wind chamber, in the bottom of which chamber nozzles are so placed as to blow down on to the type case thus blowing out the dust which is drawn to the back and ends of the apparatus through a filter to the suction of the blower, fan or bellows.

The type case is supported in a tray to which a circular motion is given and also a jogging motion as hereinafter described which agitates the whole of the type at the same time, but avoiding severe hammering or pounding of the type case.

In a modification the chamber is divided into two air tight compartments by a horizontal diaphragm. Two sets of nozzles connected to the two compartments are distributed evenly over the under surface of the chamber, said nozzles terminating immediately above the type case surface. One compartment of the chamber and therefore one set of the nozzles, is connected to the discharge of a blower or bellows, the other being connected through a filter which removes the dust from the air and retains it, to the inlet of the blower or bellows. When the blower is in operation one set of nozzles blows on to the agitated type case, and the air, carrying the dust, is sucked by the other set of nozzles and passes through the filter. Leaving the dust in the filter, the air is drawn through the blower and used again in the same way. Thus all dust is taken from the type case and deposited in the filter.

Figure 2:
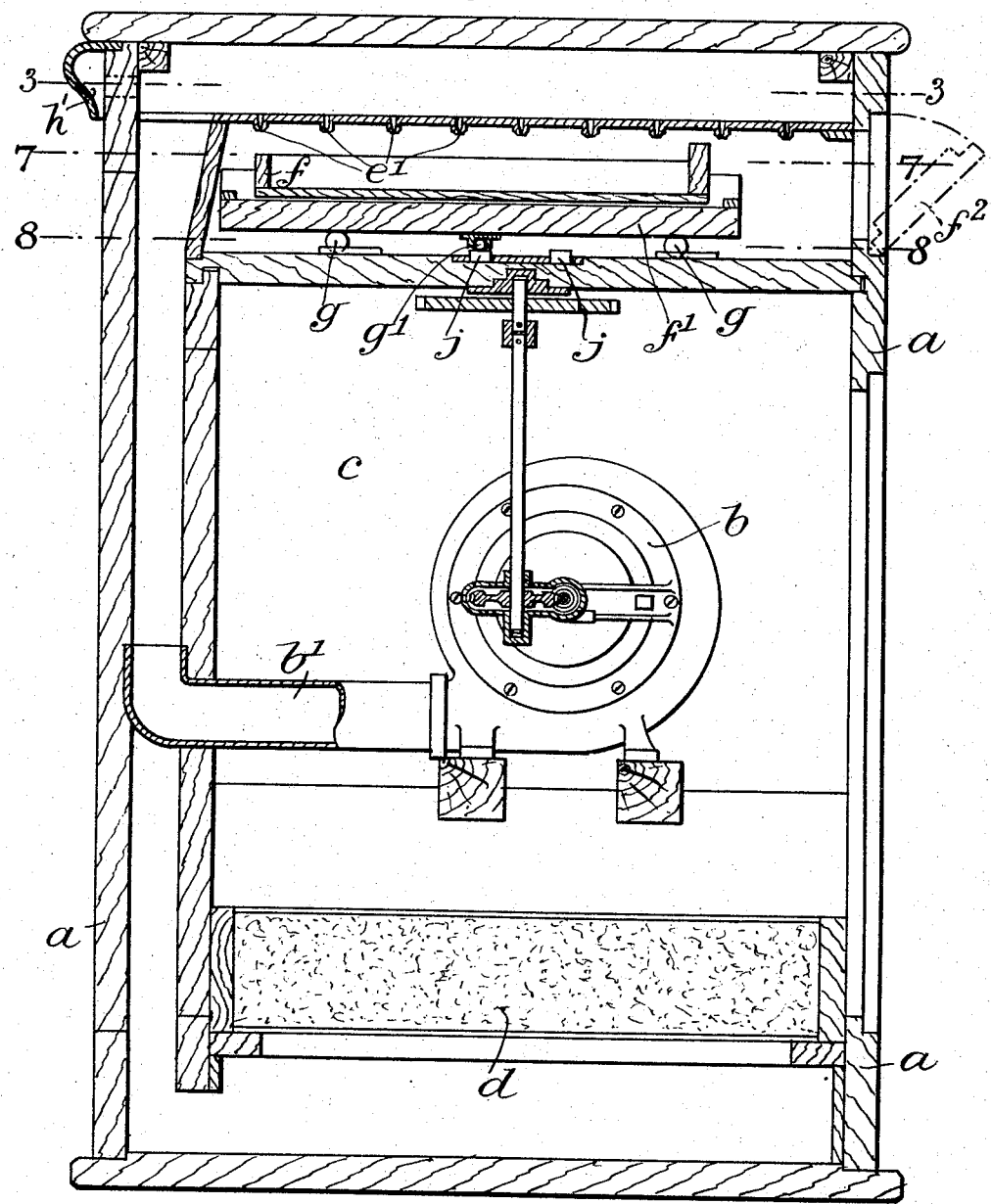
Figure 3:
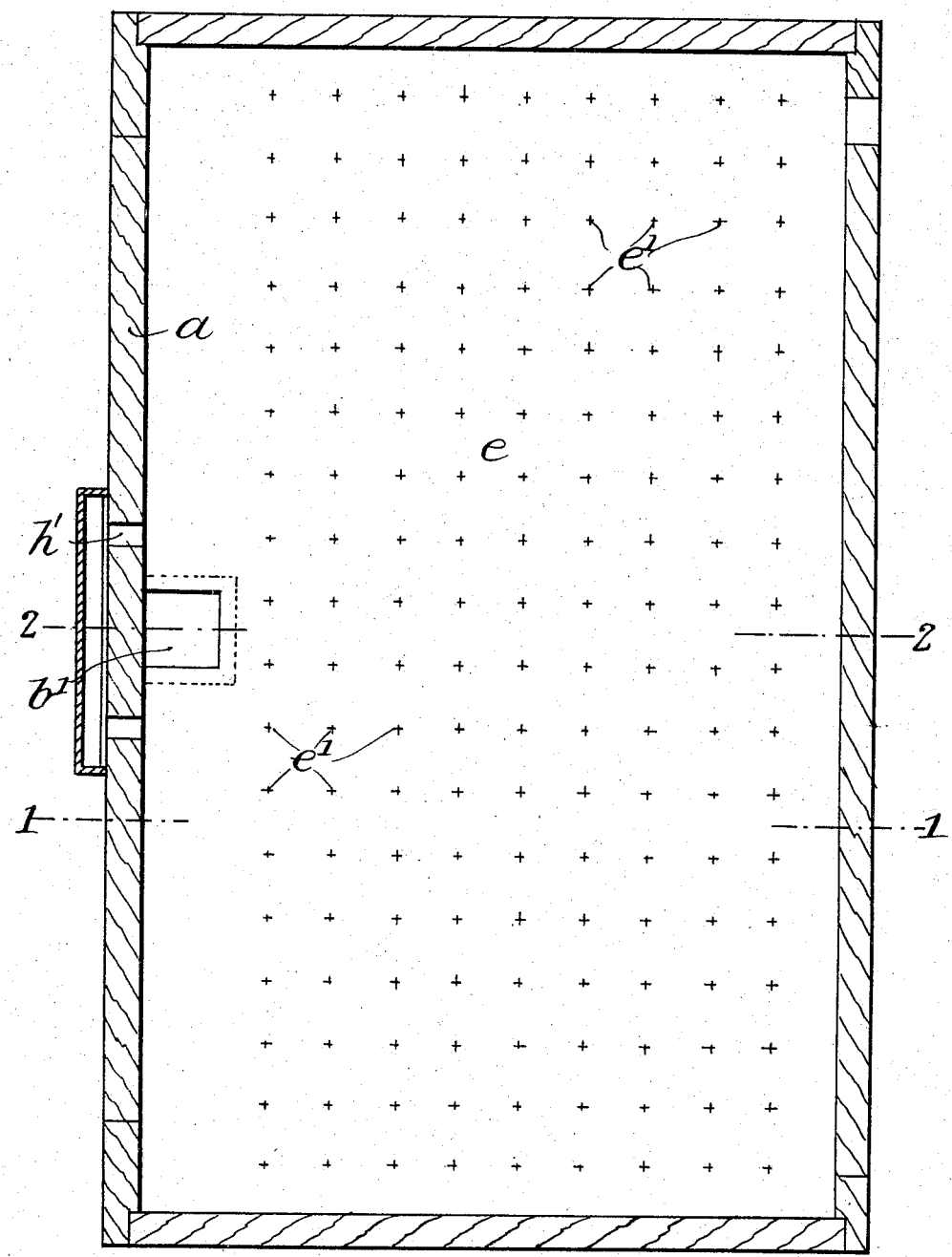
Figure 4:
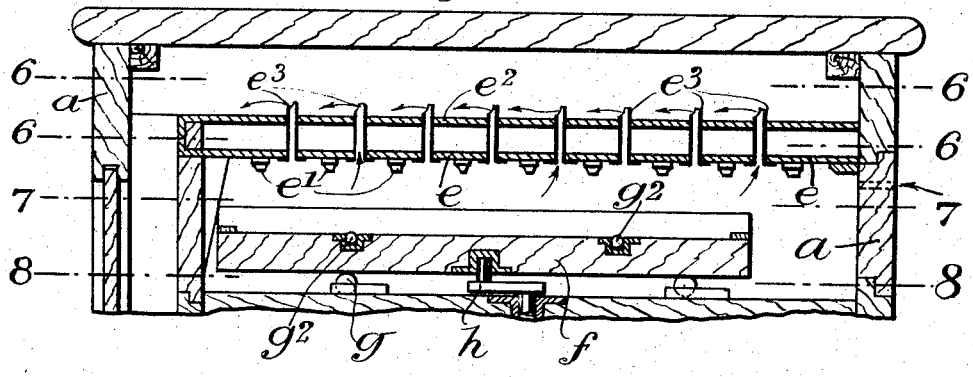
Figure 5:
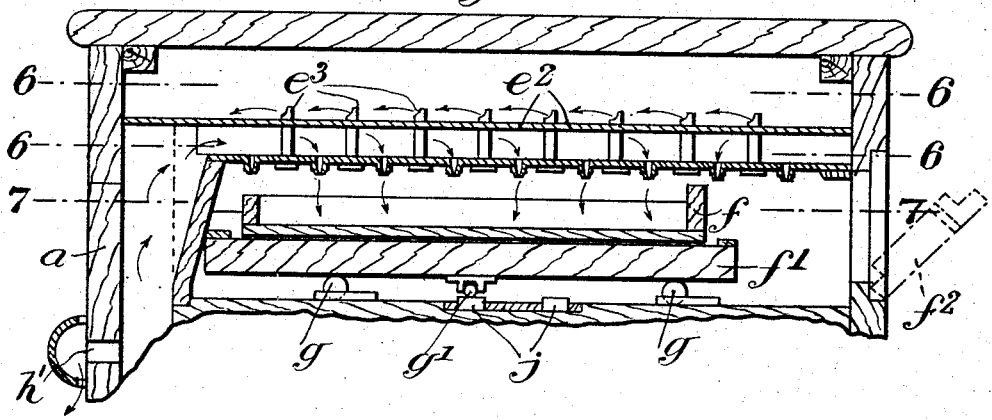
Figure 6:
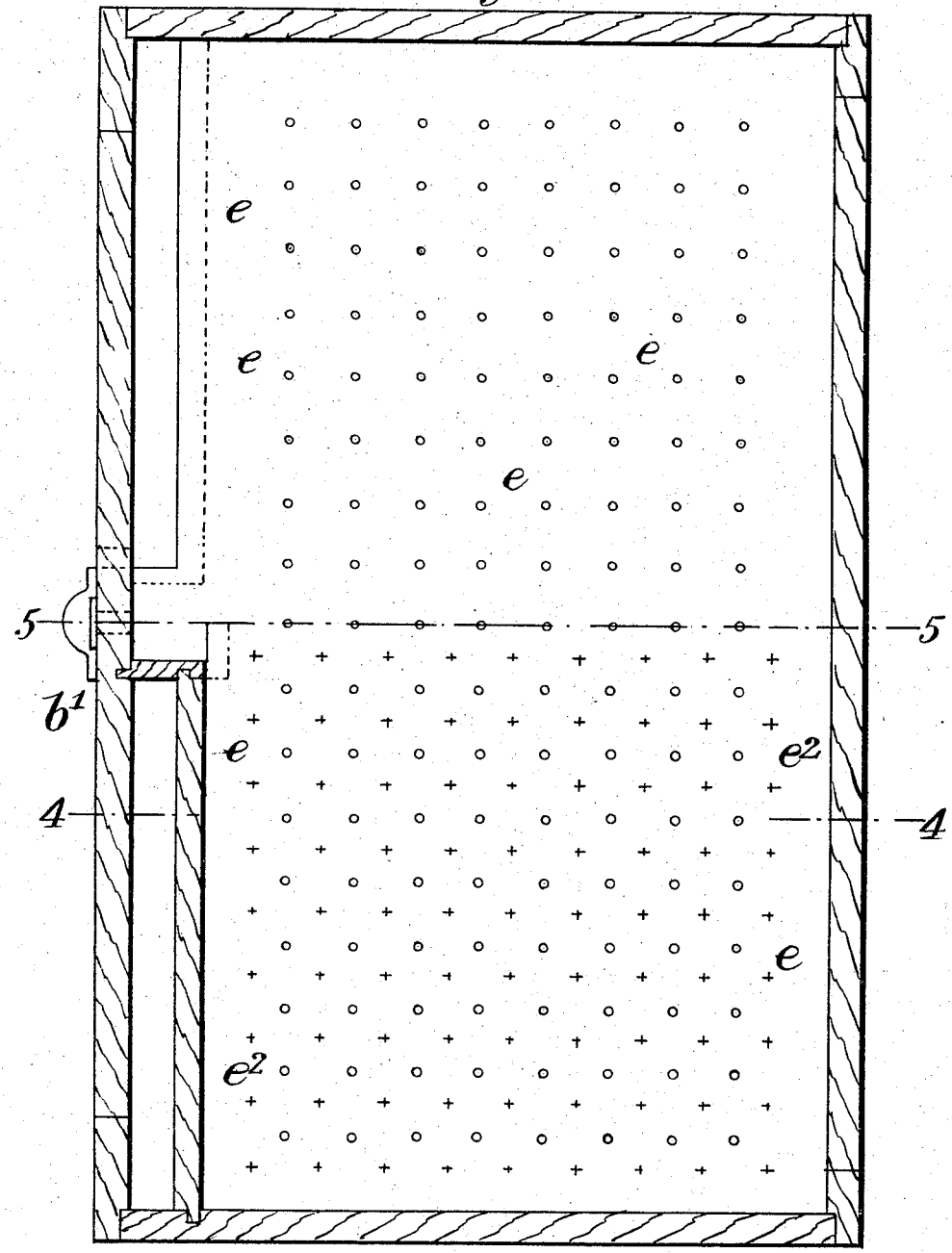
Figure 7:
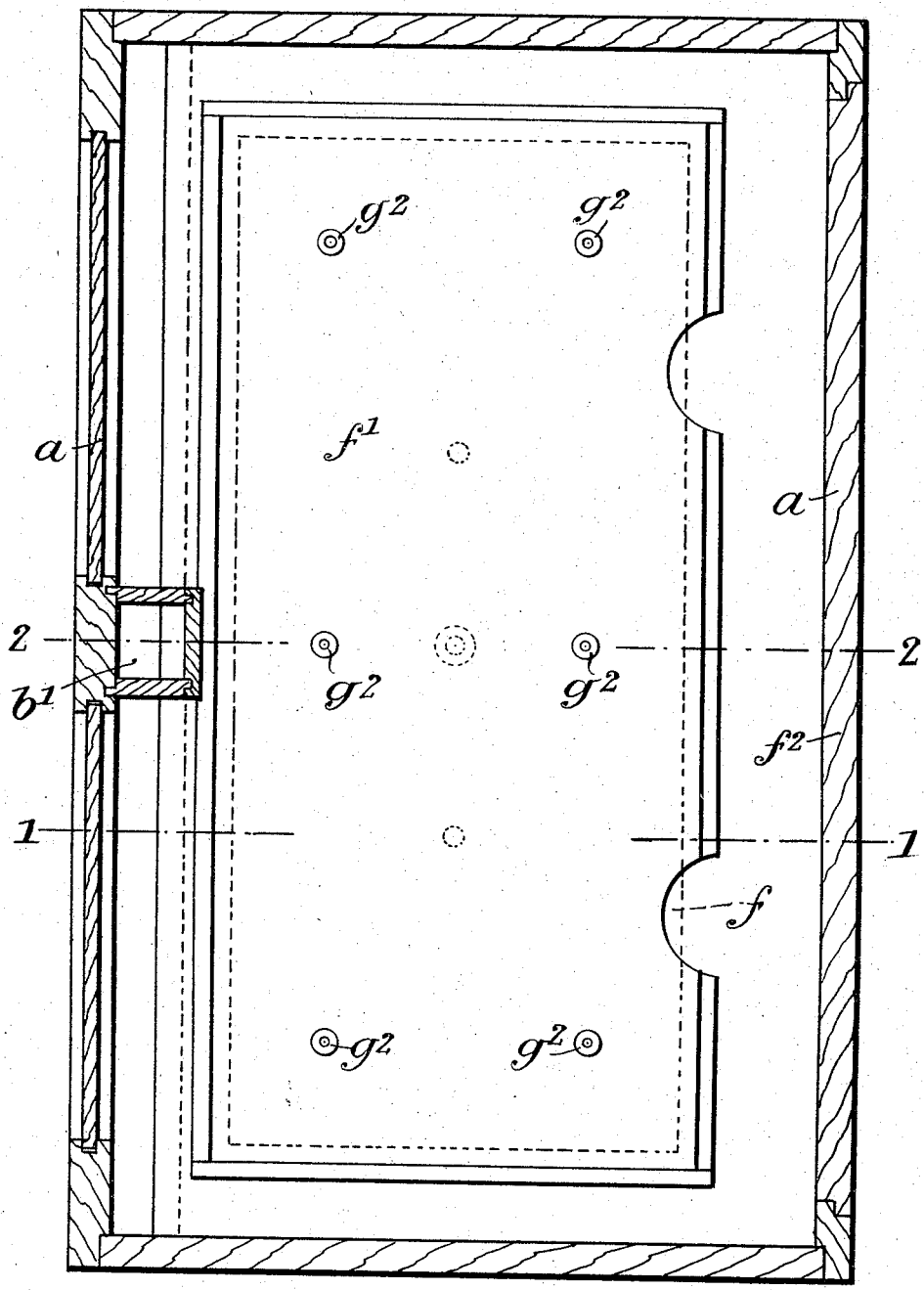
Figure 8:
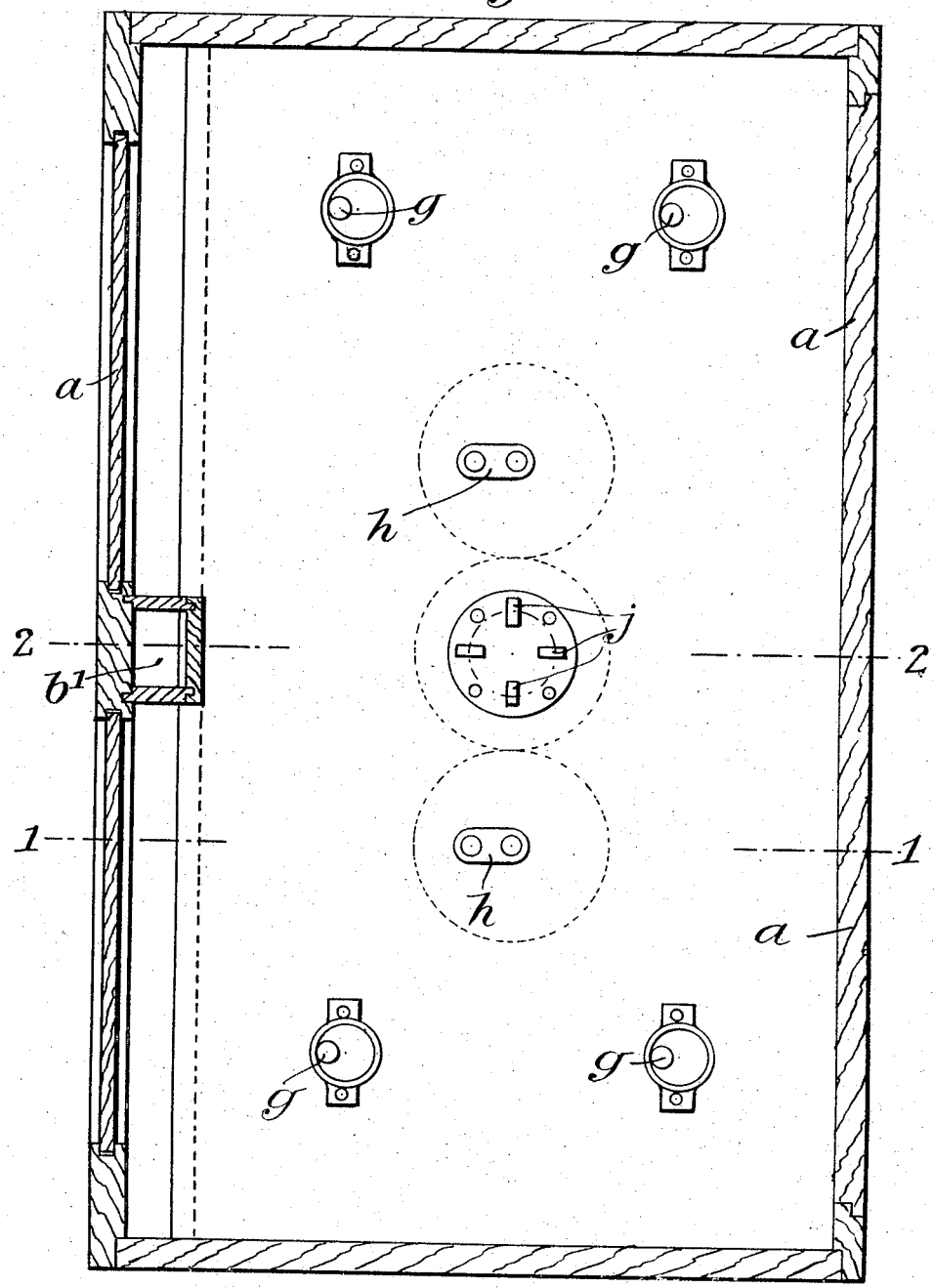
Figure 9:
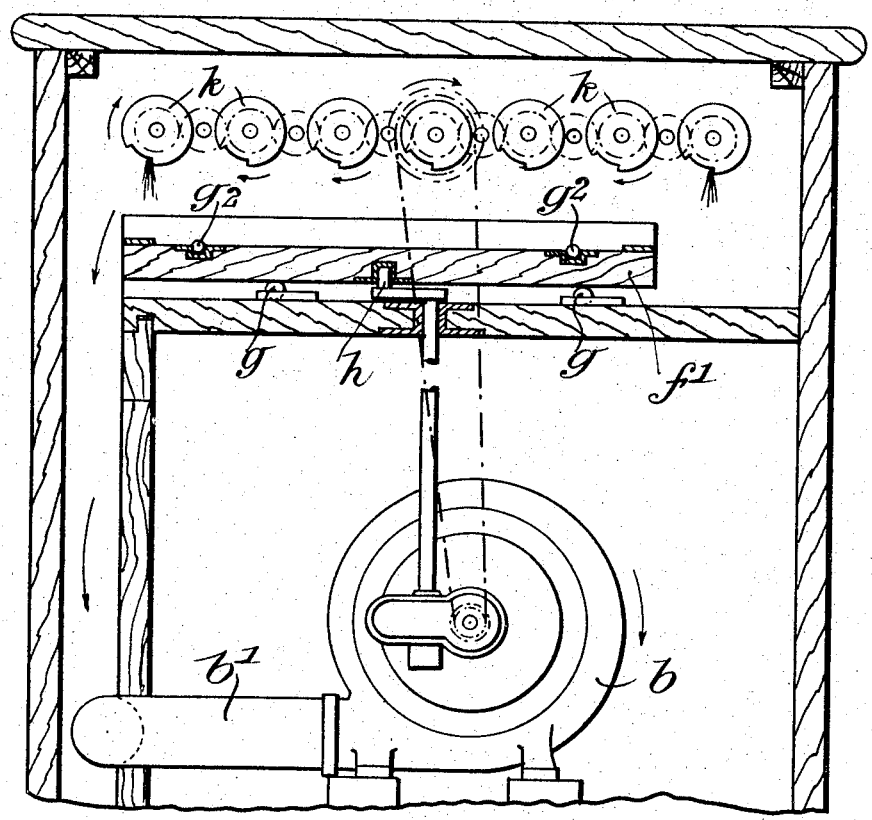
Figure 10:
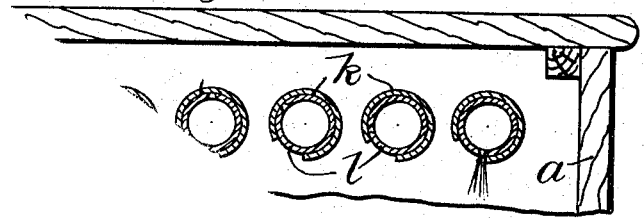

Referring to the accompanying drawings, Figure 1 is a sectional elevation of one form of my device taken on the line 1—1 in Fig. 3. Fig 2 is a similar view along the line 2—2 in Fig. 3. Fig. 3 is a sectional plan along the line 3—3 in Figs. 1 and 2. Fig. 4 is a sectional elevation of a second form of my device taken on line 4—4 in Fig. 6. Fig. 5 is a similar view on the line 5—5 in Fig. 6. Fig. 6 is a sectional plan taken on lines 6—6 in Figs. 4 and 5. Figs. 7 and 8 are sectional plans common to both forms taken on lines 7—7 and 8—8 respectively of Figs. 1-5. Fig. 9 is a part sectional elevation of a third form of my device. Fig. 10 is a sectional elevation of a detail. Fig. 11 is a part sectional plan of Fig. 10.

In the form shown in Figs. 1, 2 and 3 the whole apparatus is contained within an outer casing *a* forming a closed chamber. The blower *b* is in an inner closed chamber *c* whose floor is formed by a filter *d*. This chamber *c* extends right across the outer casing, leaving spaces on three sides of it. The upper space is divided into two parts by a horizontal diaphragm *e*, having nozzles *e'* distributed uniformly over its surface as shown in Fig. 3. The delivery of the blower *b* is led by means of the tube *b'* to the upper side of the diaphragm. The type case *f* is held in a tray *f'* underneath the diaphragm *e* so that the jets of air from the nozzles blow down between the type. The case is inserted through the door *f²*. The dust laden air is sucked through the filter *d* which extracts the dust, the dust free air being used over again. The path of the air is shown in Fig. 1 by the arrows. The tray *f'* is mounted on balls *g* and is given a circular motion by two equal cranks $h$ driven by worm gearing from the blower $b$. A jogging motion is also imparted to the tray by four small rollers $j$ and a ball $g'$. This mechanism is shown in plan in Fig. 8. In the top of the tray balls $g^2$ are mounted in sockets, and allow the type case to move slightly in a horizontal plane, as shown in Figs. 1 and 7.

In the modification shown in Figs. 4, 5 and 6 the space above the diaphragm $e$ is again divided into two chambers upper and lower, by a diaphragm $e^2$, and nozzles $e^3$ lead from the upper chamber to the under side of the diaphragm $e$. The lower chamber is connected to the delivery of the blower, and the upper to the suction through the filter $d$. Thus the dust laden air is led from the whole area of the type case insuring that all the dust is extracted.

Small air outlets and inlets $h'$ may be provided in the outer casing $a$ if desired.

In the modified form of construction shown in Figs. 9, 10 and 11 the perforated diaphragm is replaced by a number of perforated or slotted tubes $l$ rotated at the same speed and in the same direction from the blower spindle in slotted sleeves $k$. The tubes $l$ are open at one end into a chest $k'$ connected with the delivery of the blower $b$, and the perforations $e'$ are so arranged angularly that they are uncovered successively from right to left in the drawings and the slots in the sleeves $k$ are of such a size that each tube blows for about $\frac{1}{8}$ of a revolution. Thus there is a continuous sweeping action toward the vertical passage down to the filter.

What I claim and desire to secure by Letters Patent is:—

1. In apparatus for extracting the dust from type cases and other receptacles, in combination, a casing, a second casing positioned within said first casing, said second casing being smaller than said first casing, whereby a space is provided between the casings adapted to receive a receptacle, a blower within said second casing, means for leading the air from said blower to the receptacle, and a filter interposed in one of the walls of said second casing, whereby the air may pass therethrough and return to the blower within the second casing after having the dust removed therefrom.

2. In apparatus for extracting the dust from type cases and other receptacles, in combination, a casing, a second casing positioned within said first casing, said second casing being smaller than said first casing, whereby a space is provided between the casings adapted to receive a receptacle, a diaphragm within said first casing and positioned beneath the upper wall thereof and above the receptacle, said diaphragm being provided with a plurality of holes, a blower within said second casing, means for leading the air from said blower into the space between the upper wall of the first casing and said diaphragm, whereby the air will pass through the holes of the diaphragm and impinge upon the receptacle, and a filter interposed in one of the walls of said second casing, whereby the air may pass therethrough and return to the blower within the second casing after having the dust removed therefrom.

3. In apparatus for extracting the dust from type cases and other receptacles, in combination, a casing, a second casing positioned within said first casing, said second casing being smaller than said first casing, whereby a space is provided between the casings adapted to receive a receptacle, a pair of diaphragms spaced from one another to form a chamber, said diaphragms being positioned within said first casing between the upper wall thereof and the receptacle, downwardly extending nozzles communicating with said chamber and positioned above the receptacle, upwardly extending nozzles positioned above said receptacle and passing through said diaphragms and said chamber, a blower in said second casing, means for leading the air from said blower into said chamber, whereby it will pass down through said first mentioned nozzles impinging upon said receptacle and then pass upwardly through said second mentioned nozzles, and a filter interposed in one of the walls of said second casing, whereby air may pass therethrough and return to the blower within the second casing after having the dust removed therefrom.

4. In apparatus for extracting the dust from type cases and other receptacles, in combination, a casing, a second casing positioned within said first casing, said second casing being smaller than said first casing, whereby a space is provided between the casings, a tray within said space adapted to receive and hold a receptacle, means for imparting an oscillating and a jogging movement of said tray, a blower within said second casing, means for leading the air from said blower to the receptacle, and a filter interposed in one of the walls of said second casing, whereby the air may pass therethrough and return to the blower within the second casing after having the dust removed therefrom.

In testimony whereof I have affixed my signature, in presence of two witnesses.

THOMAS HENRY FISHBURN.

Witnesses:
H. D. JAMESON,
R. O. WILLIAMS.